US008219541B2

(12) United States Patent
Magnuson et al.

(10) Patent No.: US 8,219,541 B2
(45) Date of Patent: Jul. 10, 2012

(54) SYSTEM AND METHOD FOR AUTOMATICALLY DETECTING, REPORTING, AND TRACKING CONFLICTS IN A CHANGE MANAGEMENT SYSTEM

(75) Inventors: Richard Kevin Magnuson, Bellevue, WA (US); Stephen J. Siwek, Chicago, IL (US); Kelvin Lam, Bedford, MA (US); Rashmi Rekha Sahoo, Kirkland, WA (US); A. V. S. S. N. S. Sudhakar, Kakaraparru (IN); David Andrew Tootill, Mercer Island, WA (US)

(73) Assignee: CA, Inc., Islandia, NY (US)

( * ) Notice: Subject to any disclaimer, the term of this patent is extended or adjusted under 35 U.S.C. 154(b) by 328 days.

(21) Appl. No.: 12/607,745

(22) Filed: Oct. 28, 2009

(65) Prior Publication Data

US 2011/0099158 A1    Apr. 28, 2011

(51) Int. Cl.
*G06F 7/00* (2006.01)
(52) U.S. Cl. .......................... 707/708; 707/608; 707/802
(58) Field of Classification Search .................. 707/708, 707/792, 608, 802
See application file for complete search history.

(56) References Cited

U.S. PATENT DOCUMENTS

| 6,819,668 | B1 * | 11/2004 | Hackett et al. ................. 370/360 |
| 6,959,405 | B2 * | 10/2005 | Hite et al. ........................ 714/57 |
| 7,467,198 | B2 * | 12/2008 | Goodman et al. ............. 709/223 |
| 7,912,804 | B1 * | 3/2011 | Talwar et al. ................... 706/47 |
| 2002/0184242 | A1 * | 12/2002 | Holtz et al. ................... 707/200 |
| 2003/0163393 | A1 * | 8/2003 | Mittal et al. .................... 705/27 |
| 2005/0060409 | A1 * | 3/2005 | Dube et al. .................... 709/226 |
| 2005/0159969 | A1 * | 7/2005 | Sheppard ........................... 705/1 |
| 2006/0020570 | A1 * | 1/2006 | Wu .................................... 707/1 |
| 2006/0161879 | A1 * | 7/2006 | Lubrecht et al. ............... 717/101 |
| 2006/0173850 | A1 * | 8/2006 | Auer et al. ....................... 707/10 |
| 2006/0248128 | A1 * | 11/2006 | Acharya et al. ............... 707/203 |
| 2007/0067373 | A1 * | 3/2007 | Higgins et al. ................ 707/206 |
| 2007/0100892 | A1 * | 5/2007 | Kephart et al. ............... 707/200 |
| 2007/0256050 | A1 * | 11/2007 | Behnia et al. ................. 717/104 |
| 2008/0060021 | A1 * | 3/2008 | Basse et al. ...................... 725/63 |
| 2008/0115137 | A1 * | 5/2008 | Gower et al. .................. 718/102 |
| 2008/0195759 | A1 * | 8/2008 | Novik et al. ................... 709/248 |
| 2008/0219170 | A1 * | 9/2008 | Marcellin .................. 370/238.1 |
| 2009/0133026 | A1 * | 5/2009 | Aggarwal et al. ............. 718/103 |
| 2009/0133032 | A1 * | 5/2009 | Biles et al. .................... 718/106 |
| 2009/0216714 | A1 * | 8/2009 | Gonzalez et al. ................. 707/3 |
| 2009/0288074 | A1 * | 11/2009 | Carroll et al. ................. 717/158 |
| 2010/0138762 | A1 * | 6/2010 | Reghetti et al. ............... 715/765 |
| 2010/0169272 | A1 * | 7/2010 | Labatte et al. ................ 707/608 |
| 2010/0251247 | A1 * | 9/2010 | Pedersen ....................... 718/102 |
| 2010/0318391 | A1 * | 12/2010 | Gvirtsman et al. ............... 705/7 |
| 2011/0022814 | A1 * | 1/2011 | Kottomtharayil et al. .... 711/170 |

(Continued)

*Primary Examiner* — Phuong Thao Cao
(74) *Attorney, Agent, or Firm* — Pillsbury Winthrop Shaw Pittman LLP

(57) ABSTRACT

A system and method for automatically detecting, reporting, and tracking conflicts in a change management system is provided. In particular, the system and method described herein may be used to identify potential conflicts associated with resources and schedules involved in a proposed change to an information technology infrastructure. A conflict analysis engine may analyze a change order that includes planned changes to an information technology infrastructure to identify potential conflicts associated with the change order that includes the planned changes to the information technology infrastructure. The potential conflicts may then be added to a conflicts list for the change order and a workflow may be created to manage resolving the potential conflicts. Thus, in response to resolving the potential conflicts, the planned changes may be deployed within the information technology infrastructure.

26 Claims, 4 Drawing Sheets

U.S. PATENT DOCUMENTS

2011/0078685 A1* 3/2011 Iyengar et al. ................ 718/101
2011/0239191 A1* 9/2011 Ramachandran ............. 717/121
2011/0302290 A1* 12/2011 Westerfeld et al. ........... 709/223
2012/0016713 A1* 1/2012 Wilcock et al. .............. 705/7.27

* cited by examiner

SYSTEM AND METHOD FOR AUTOMATICALLY DETECTING, REPORTING, AND TRACKING CONFLICTS IN A CHANGE MANAGEMENT SYSTEM

FIELD OF THE INVENTION

The invention generally relates to a system and method for automatically detecting, reporting, and tracking conflicts in a change management system, and in particular, to identifying potential conflicts associated with resources and schedules that may be involved in a proposed change to an information technology infrastructure.

BACKGROUND OF THE INVENTION

Disconnected change processes tend to be an unfortunate reality for many information technology organizations, as various systems that are typically used to manage changes in an information technology infrastructure tend to not be linked. Existing systems designed to manage changes in an information technology, infrastructure tend to employ silos of automation, which are often disconnected from one another. For example, help desk systems typically have little or no visibility into changes that may affect end users that the help desk systems are designed to assist, even though the changes are often a major cause of the service disruptions that result in the end users calling the help desk. Conversely, developers often need access to operational system configurations in order to understand the potential impact that any changes that are to be implemented for the information technology infrastructure.

As such, managing changes to an information technology infrastructure within separate domains, through different methods, and with disconnected automation tools can often limit visibility, reduce control over the change process, and introduce a greater potential for errors. Nonetheless, although one of the primary purposes of the change management discipline is to reduce risk to business when changes occur, existing change management systems tend to fall short in providing global visibility into the cost and impact that the changes may cause. This drawback tends to be especially important in an information technology organization where the relationships between resources are complex. Due to the disconnected nature of automated silos that are typically used in change management, the ability to capture and communicate planned changes will only be as good as the people involved, or alternatively will be limited by the weakest link in the chain.

When human resources are relied upon to assess the impact of proposed changes to often intricate information technology infrastructures, even well planned and well organized changes can fail. In fact, many leading information technology analysts have indicated that failed changes are often a major cause of system outages and errors, which may result in a business suffering negative consequences such as financial loss, project delays, and customer dissatisfaction, among other things. In many cases, changes may fail and increase risk due to factors that are overlooked because of the lack of global visibility. For example, changes may be scheduled during a period that overlaps with other scheduled changes, changes may unintentionally impact related systems and business services, changes may involve resources that are unavailable outside of planned downtime, or the changes may requires resources that are unavailable at the scheduled time.

Accordingly, systems that manage changes to an information technology infrastructure should include mechanisms for performing analysis that can prevent these and other types of conflicts from occurring. However, existing systems have traditionally delegated this analysis to human resources, leading to an increased likelihood of errors, miscommunications, or other problems that can result in potential conflicts remaining undetected. Moreover, the complexity involved with assessing every potential conflict may be astronomical in organizations that have large information technology infrastructures. As such, trusting that human resources can suitably identify every potential conflict associated with a proposed change tends to be unfeasible (if not impossible) in many contexts. Thus, existing change management systems tend to suffer from various drawbacks.

SUMMARY OF THE INVENTION

According to one aspect of the invention, a system and method for automatically detecting, reporting, and tracking conflicts in a change management system may be used to identify potential conflicts associated with resources and schedules involved in a proposed change to an information technology infrastructure, which may address one or more of the foregoing drawbacks of existing systems. For example, the conflicts detected in the change management system may include one or more planned changes having a scheduled change to a resource that collides with another scheduled change to the resource, one or more planned changes defining a scheduled change to a resource that impacts another resource in the information technology infrastructure, one or more planned changes having a scheduled change to a resource that falls outside a maintenance window that defines a time period when the resource can be safely removed from the information technology infrastructure, one or more planned changes having a scheduled change to a resource that falls within a blackout window that defines a time period when no changes can occur to the resource, and/or one or more planned changes having a scheduled change to a resource that falls within a time period when a human resource required to implement the scheduled change will be unavailable.

According to one aspect of the invention, the system for automatically detecting, reporting, and tracking conflicts in a change management system, may comprise a change management system configured to receive a change order that includes one or more planned changes to an information technology infrastructure. A conflict analysis engine coupled to the change management system may then identify one or more potential conflicts associated with the change order that include the planned changes to the information technology infrastructure and add any potential conflicts identified for the change order to a conflicts list for the change order. A workflow management system may then create a workflow to manage resolving the potential conflicts in the conflicts list for the change order and permit the planned changes to be deployed within the information technology infrastructure in response to the workflow resolving the potential conflicts in the conflicts list.

According to one aspect of the invention, the method for automatically detecting, reporting, and tracking conflicts in a change management system may comprise receiving a change order that includes one or more planned changes to an information technology infrastructure at a change management system. The method may further comprise a conflict analysis engine identifying one or more potential conflicts associated with the change order that includes the planned changes to the information technology infrastructure and adding the one or more potential conflicts associated with the change order to a conflicts list for the change order. In addition, the method may further comprise creating, at a workflow management system, a workflow to manage resolving the potential conflicts in the conflicts list for the change order, wherein the planned changes may be deployed within the information technology infrastructure in response to the workflow managed by the workflow management system resolving the potential conflicts in the conflicts list.

Other objects and advantages of the invention will be apparent to those skilled in the art based on the following drawings and detailed description.

DETAILED DESCRIPTION

Figure 1:
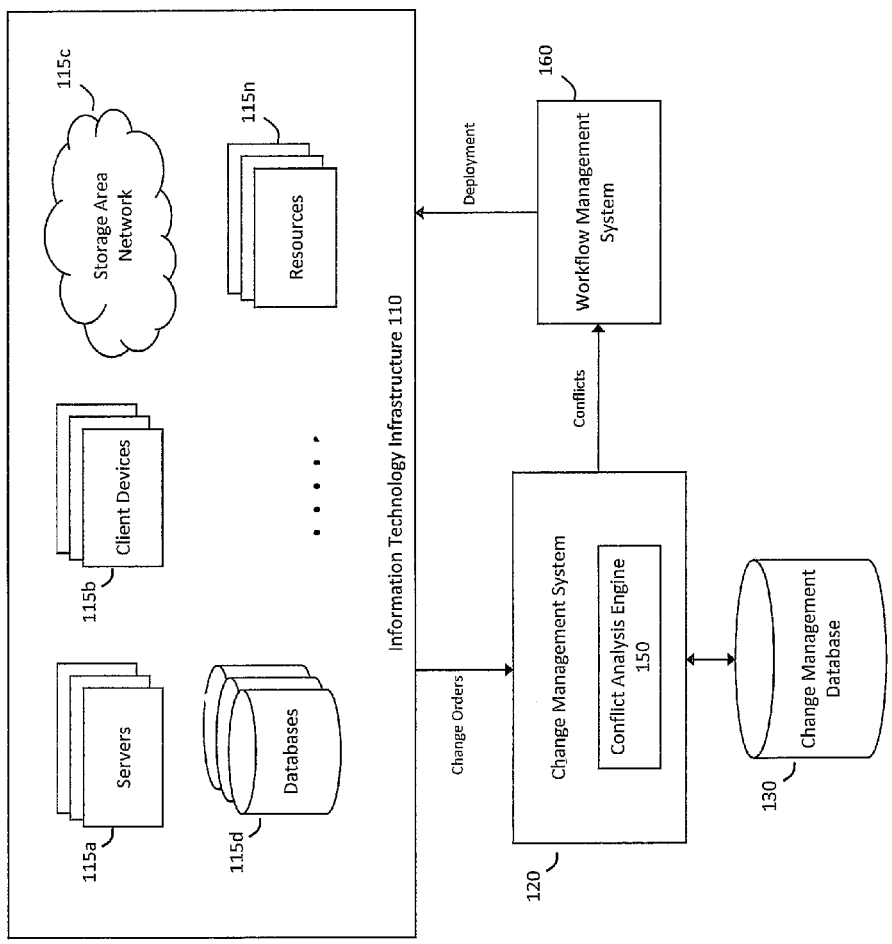
FIG. 1 illustrates a block diagram of an exemplary system for automatically detecting, reporting, and tracking conflicts in a change management system, according to one aspect of the invention.

According to one aspect of the invention, FIG. 1 illustrates an exemplary system 100 for automatically detecting, reporting, and tracking conflicts in a change management system 120. In particular, the change management system 120 illustrated in FIG. 1 may provide an integrated solution to manage risk to a business that may occur from changes to an information technology infrastructure 110, which may generally include various information technology resources 115n. For example, the information technology infrastructure 110 associated with any particular business may include various servers 115a, client devices 115b, storage area networks 115c, databases 115d, and other information technology resources 115n. Moreover, various relationships may exist among the information technology resources 115n provided in the information technology infrastructure 110, whereby managing the information technology resources 115n and the relationships among the information technology resources 115n may represent a complex task can introduce substantial risk to a business. In particular, the hardware components, software components, applications, and other information technology resources 115n included in the information technology infrastructure 110 may vary significantly from one business to another. Moreover, businesses may frequently implement changes to the information technology resources 115n included in the information technology infrastructure 110 in addition to relationships among the information technology resources 115n to meet changing business needs. Thus, the change management system 120 may include various components that can provide visibility into the information technology infrastructure 110, which may provide businesses with a mechanism to organize and regulate changes to the information technology infrastructure 110.

In particular, the change management system 120 may include a change management database 130 that stores a model of the information technology infrastructure 110, wherein the model may represent the various resources 115n in the information technology infrastructure 110 in addition to any dependencies or other relationships among the various resources 115n in the information technology infrastructure 110. For example, in one implementation, the change management database 130 may store various configuration items, which may generally correspond to any suitable physical resources 115n and logical resources 115n managed in the change management system 120 (e.g., entire business applications, stand-alone source code modules, hardware components, documentations, service level agreements, etc.). Furthermore, in one implementation, the configuration items may be organized recursively within the change management database 130, wherein any particular configuration item may contain one or more other configuration items. For example, a configuration item for a server 115a may contain configuration items for one or more application resources 115n hosted on the server 115a, while the configuration items for the application resources 115n may further contain configuration items for various application program resources 115n that make up the application resources 115n.

In addition, the change management database 130 may further store information relating to various schedules and contacts that may be relevant to the configuration items stored in the change management database 130. For example, the schedules stored in the change management database 130 may include maintenance windows that define time periods when certain resources 115n can be safely removed from the information technology infrastructure 110, change blackout windows that define time periods when certain resources 115n in the information technology infrastructure 110 cannot be changed or removed, human resource schedules that define time periods when certain human resources 115n may be available, or any other suitable schedule that may be relevant to the configuration items stored in the change management database 130. Furthermore, the contacts stored in the scheduling database may include users involved with planned changes to the information technology infrastructure 110, and in one implementation, the contacts may include roles for the users involved in the planned changes (e.g., affected end user, implementer, change manager, etc.).

Thus, the change management database 130 may store various configuration items corresponding to the resources 115n in the information technology infrastructure, wherein the change management system 120 may reference the change management database 130 to determine interrelationships among the resources 115n in the information technology infrastructure in addition to any operational impacts that the resources 115n may have on services that the information technology infrastructure 110 delivers to a business. Moreover, the schedules and contacts stored in the change management database 130 may provide further context for the planned changes to the information technology infrastructure 110, including schedules that define certain time periods for suitably implementing planned changes to the information technology infrastructure 110 and contacts that define certain users involved in the planned changes. The change management database 130 may therefore store various types of information that the change management system 120 can reference to record information about planned changes to the information technology infrastructure 110 and any resources 115n involved in the planned changes, whereby the change management database 120 may reference the change management database 130 to organize, analyze, track, and communicate information about the planned changes.

In one implementation, the change management system 120 may further include a conflict analysis, engine 150 for automatically detecting, reporting, and tracking conflicts that may be associated with the planned changes to the information technology infrastructure 110. The conflict analysis engine 150 may generally be configured to review the planned changes to the information technology infrastructure 110 and identify any situations that may result in conflicts or other business risks. In one implementation, any particular of the information technology infrastructure 110 may create a change order to electronically represent a planned change to the information technology infrastructure 110. For example, in one implementation, change orders may be created using the CA Service Desk Manager®, which may include an interface that allows the user to describe any suitable aspect of the planned change to the information technology infrastructure 110. In response to the change management system 150 receiving the change orders that electronically represent the planned changes, the change management system 120 may store information relating to the change orders in the change management database 130.

In one implementation, the change management system 120 may then invoke the conflict analysis engine 150 to identify any potential conflicts associated with the change orders for the information technology infrastructure 110. In one implementation, the change management system 120 may be configured to automatically invoke the conflict analysis engine 150 to identify potential conflicts whenever a change order has been created and/or updated in order to provide real-time information about change order conflicts. In particular, the conflict analysis engine 150 may evaluate the change orders in view of the information stored in the change management database 130 from various perspectives to identify any potential conflicts or risks that may be associated with the change orders. For example, as will be described in greater detail below, the conflict analysis engine 150 may analyze the change orders to identify conflicts such as multiple change orders for the same resource 115n having overlapping implementation schedules, change orders to particular resources 115n having potential impacts on other resources 115n, change orders having implementation schedules that fall outside of suitable maintenance windows or within change blackout windows, change orders that require certain human resources 115n having implementation schedules when the required human resources 115n may be unavailable, or any other suitable conflict, as will be apparent.

In one implementation, in response to the conflict analysis engine 150 analyzing the change orders, the conflict analysis engine 150 may generate a conflict list that includes any conflicts identified for the change orders. Furthermore, in response to the conflict analysis engine 150 determining that a particular change order has potential conflicts with one or more other change orders, the conflict analysis engine 150 may add such conflicts to a conflict list for the other change orders. In one implementation, the change management system 120 may then provide the conflict lists to a workflow management system 160 to resolve the conflicts, wherein the workflow management system 160 may create one or more workflows to coordinate resolution of the conflicts in the conflict lists. For example, in one implementation, the workflow management system 160 may identify any resources 115n involved in the change orders that have conflict lists and communicate information relating to the conflicts to the appropriate resources (e.g., contacts having implementer, affected user, or change manager; roles in a context for the change orders, information technology resources 115n involved in or impacted by the change orders, etc.).

The workflow management system 160 may therefore communicate information relating to the conflicts in the conflict list throughout the information technology infrastructure 110, as appropriate, and coordinate processes to resolve the conflicts. For example, in one implementation, each of the potential conflicts in the conflict lists may include a status value that indicates the current status for the respective conflict (e.g., pending, deferred, resolved, etc.). Moreover, each of the potential conflicts in the conflict lists may further include a comments field, wherein contacts or other appropriate users may enter information in the comments field to communicate information relating to the conflicts, the current status of the conflicts, or other appropriate information. For example, certain conflicts, such as multiple changes planned simultaneously for a particular resource 115n, may not necessarily represent actual problems and may even be advantageously or intentionally planned. Thus, the workflow may enable the appropriate resources 115n to view one or more of the conflicts in the conflict lists and modify the status value, the comments field, or other appropriate information for the conflicts. For example, in the exemplary context of multiple changes planned simultaneously for a particular resource 115n, the workflow may communicate the potential conflict with a status value of "pending" to an appropriate contact, and the contact may change the status value for the conflict to "resolved" and enter information into the comments field indicating that the multiple changes were advantageously or intentionally planned such that other contacts may be aware of the reason underlying the resolution of the potential conflict. Thus, in response to coordinating the workflow to manage the potential conflicts in the conflict lists and subsequently determining that the conflicts in the conflict lists have been suitably resolved, the change orders may then be deployed to permit implementation of the corresponding planned changes to the information technology infrastructure 110.

Figure 2:
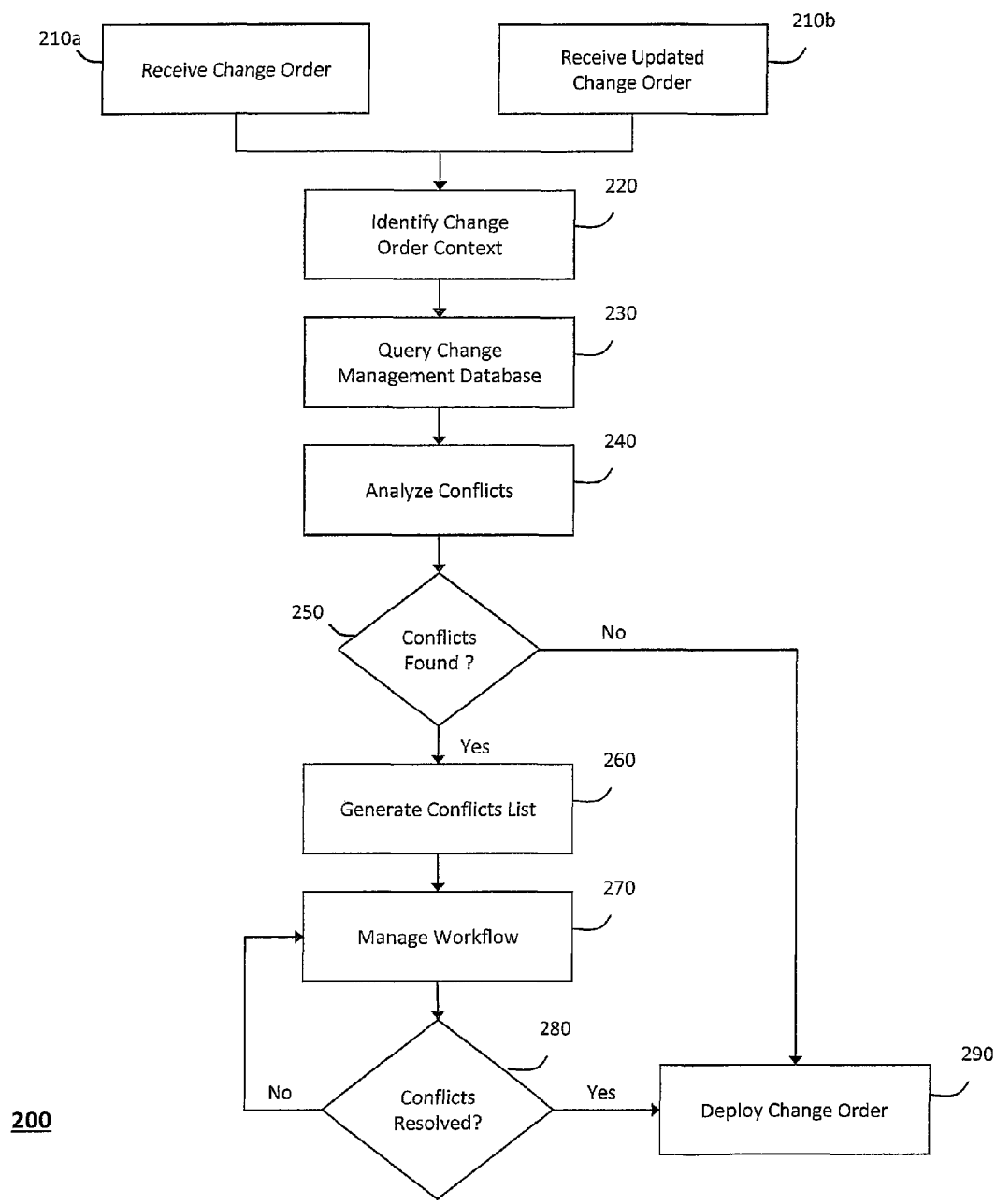
FIG. 2 illustrates a flow diagram of an exemplary method for automatically detecting, reporting, and tracking conflicts in a change management system, according to one aspect of the invention.

According to one aspect of the invention, FIG. 2 illustrates an exemplary method 200 for automatically detecting, reporting, and tracking conflicts in a change management system. In one implementation, the method 200 may be automatically invoked whenever the change management system receives a newly created change order in an operation 210a, and may further be invoked automatically whenever the change management system receives an updated change order in an operation 210b. For example, as noted above, any particular of an information technology infrastructure may suitably create a new change order and/or update an existing change order to create an electronic representation for a planned change to the information technology infrastructure. Change orders may generally be created using any suitable system or application that enables the user to describe the planned change to the information technology infrastructure, such as CA Service Desk Manager®. In response to receiving the newly created change order in operation 210a or the updated change order in operation 210b, a conflict analysis engine may then be invoked to identify any potential conflicts associated with the change order.

In one implementation, to identify the potential conflicts associated with the change order, an operation 220 may include the conflict analysis engine identifying a context for the change order. For example, in one implementation, the context for the change order may include one or more resources in the information technology infrastructure involved in the change order, a schedule defining a time period when the change order will be implemented in the information technology infrastructure, one or more contacts defining users involved in the change order, or any other suitable information relevant to the context of the change order. In response to identifying the relevant context for the change order, the conflict analysis engine may then query a change management database in an operation 230. In particular, the conflict analysis engine may query the change management database to retrieve information for evaluating the context for the change order from various perspectives to identify any potential conflicts or risks that may be associated with the change orders.

For example, in one implementation, operation 230 may include querying the change management database to identify any other resources that may be related to the context for the change order, any schedules that define time periods relevant to the context for the change order, any contacts that define users that may be related to the context for the change order, or any other suitable information relevant to the context for the change order. Thus, in response to identifying the context for the change order in operation 220 and retrieving any information stored in the change management database that may be related to the context for the change order in operation 230, the conflict analysis engine may then analyze the context for the change order in view of the information retrieved from the change management database to identify any potential conflicts for the change order. In particular, as will be described in greater detail below in connection with FIG. 3a, an operation 240 may include analyzing the change order to identify any potential resource conflicts (e.g., a potential resource conflict may be identified when the change order has a schedule that overlaps with a schedule in another change order and both change orders relate to the same resource). Furthermore, as will be described in greater detail below in connection with FIG. 3b, operation 240 may further include analyzing the change order to identify any potential scheduling conflicts (e.g., a potential scheduling conflict may be identified when the change order has a schedule that falls within a change blackout window that defines a time period when no changes to the information technology infrastructure should occur).

In one implementation, in response to analyzing the change order for any resource conflicts and/or scheduling conflicts in operation 240, the conflict analysis engine may then determine whether any potential resource conflicts and/or scheduling conflicts were found for the change order in an operation 250. In response to determining that no potential conflicts were returned for the change order, the change management system may then approve the change order and permit the change order to be deployed in an operation 290. However, in response to determining that one or more potential conflicts were returned for the change order, the conflict analysis may generate a conflict list for the change order in an operation 260. In particular, the conflict list generated in operation 260 may generally include any resource conflicts and/or scheduling conflicts that were identified for the change order in operation 240. Furthermore, if the potential conflicts included in the conflict list generated in operation 260 relate to one or more other change orders, then operation 260 may further include adding such conflicts to a conflict list for the other change orders.

In one implementation, the change management system may then provide the conflict list generated in operation 260 to a workflow management system to resolve the conflicts. The workflow management system may then manage one or more workflows in an operation 270 to coordinate resolution of the potential conflicts in the conflict list. For example, the workflow management system may identify the resources, schedules, and contacts included in the change order context identified in operation 220. The workflow managed in operation 270 may therefore involve the workflow management system communicating information relating to the potential conflicts throughout the information technology infrastructure based on the change order context as appropriate to coordinate processes to resolve the conflicts. For example, in one implementation, the workflow managed in operation 270 may be communicated to a contact that created the change order to notify the corresponding user of the conflicts, to a change manager responsible for overseeing implementation of planned changes, or another appropriate contact (e.g., the contact may reschedule the change order to resolve a scheduling conflict). In another example, the workflow managed in operation 270 may automatically control certain resources involved in the change order (e.g., shutting down a resource impacted by the change order and enabling a suitable backup resource during a time period when the change order has been scheduled).

In one implementation, the workflow managed in operation 270 may therefore coordinate various processes among resources and contacts to resolve the potential conflicts for the change order until the potential conflicts have been resolved. For example, in one implementation, each of the potential conflicts in the conflict list may include a status value that indicates the current status for the respective conflict (e.g., pending, deferred, resolved, etc.). Moreover, each of the potential conflicts in the conflict list may further include a comments field, wherein contacts or other appropriate users may enter information in the comments field to communicate information relating to the conflicts, the current status of the conflicts, or other appropriate information. Thus, the workflow managed in operation 270 may enable the appropriate contacts to view one or more of the conflicts in the conflict list and modify the status value, the comments field, or other appropriate information for the conflicts. Moreover, the workflow managed in operation 270 may further enable involved resources, impacted resources, or other appropriate resources to interact in the conflict resolution process (e.g., if a change to a particular network switch impacts client devices, server devices, or other network devices that communicate through the switch, the workflow may reconfigure the impacted devices to communicate through another network switch until the change to the particular network switch has been suitably implemented).

Thus, in response to coordinating the workflow to manage the potential conflicts in the conflict lists, an operation 280 may include determining whether the workflow resolved all of the potential conflicts for the change order. In response to determining that any of the potential conflicts for the change order remain unresolved, operation 280 may return control to operation 270 for further management of the workflow, which may continue in an iterative manner until operation 280 results in a determination that each of the potential conflicts have been resolved. In response operation 280 resulting in such a determination, the change order may be approved and the change order may be permitted to be deployed in operation 290, wherein deploying the change order may generally include implementing the changes planned in the change order within the information technology infrastructure.

Figure 3A:
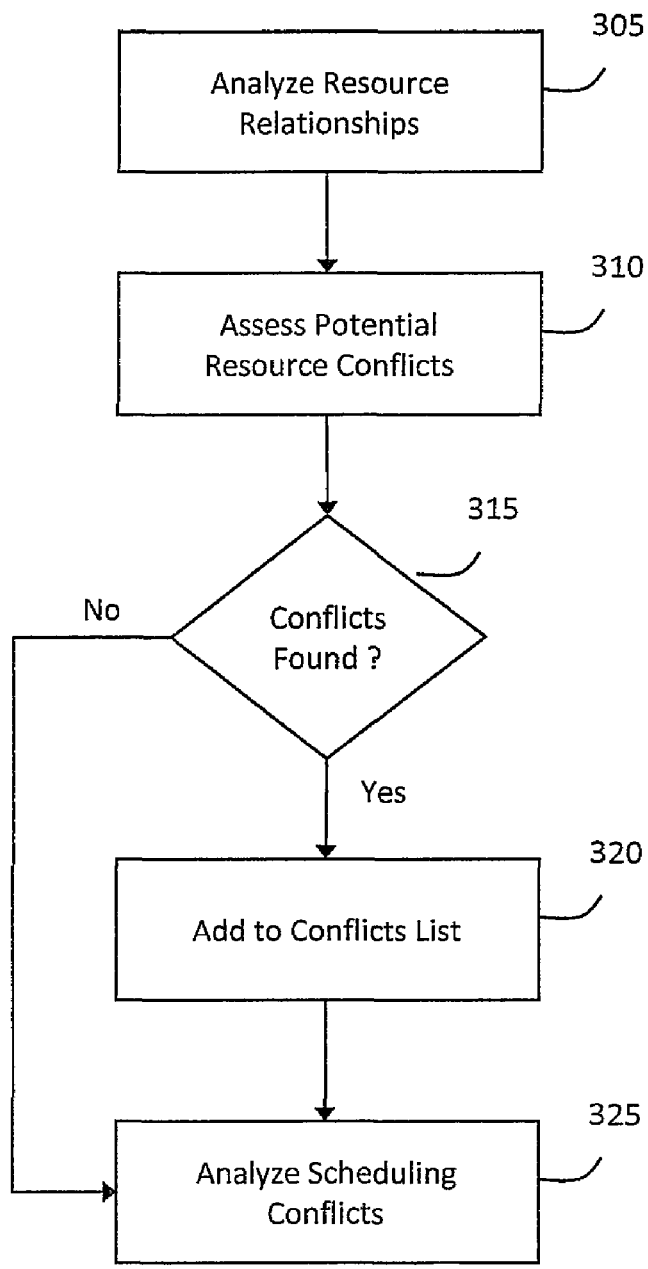
FIG. 3a illustrates a flow diagram of an exemplary method for automatically detecting resource conflicts in a change management system, according to one aspect of the invention.

According to one aspect of the invention, FIG. 3a illustrates an exemplary method 300a for automatically detecting resource conflicts in a change management system. In particular, the method 300a may generally be performed in the context of operation 240 in FIG. 2 to automatically detect one or more resource conflicts in a change order provided to the change management system. As such, the method 300a illustrated in FIG. 3a may include automatically invoking a conflict analysis engine in response to the change management system receiving the change order. In one implementation, the conflict analysis engine may then analyze various resource relationships for the change order in an operation 305. For example, operation 305 may include the conflict analysis engine identifying a context for the change order to identify one or more resources in an information technology infrastructure involved in the change order, a schedule for implementing the change order in the information technology infrastructure, one or more contacts defining users involved in the change order, or any other suitable information relevant to the change order context.

Furthermore, operation 305 may further include identifying one or more resources, schedules, contacts, or other aspects of the information technology infrastructure that may be impacted by or otherwise related to the resources involved in the change order, the schedule for implementing the change order, or the contacts involved in the change order. For example, in one implementation, analyzing the resource relationships in operation 305 may include the conflict analysis engine querying a change management database to retrieve information for evaluating the context for the change order from various perspectives to identify any potential resource conflicts or resource risks that may be associated with the change orders. Thus, in an operation 310, the conflict analysis engine may then evaluate the context for the change order in view of the information retrieved from the change management database to assess any potential resource conflicts for the change order.

In one implementation, assessing the potential resource conflicts for the change order in operation 310 may include determining whether the schedule for implementing the change order in the information technology infrastructure collides with any other schedules associated with the information technology infrastructure that involve the same resources as the change order. For example, a potential resource collision conflict may be identified in response to determining that the change order includes a planned change to one or more resources scheduled at a time that coincides, overlaps, or otherwise collides with another change order that schedules a planned change involving one or more of the same resources. To identify potential resource collision conflicts for the current change order, the conflict analysis engine may analyze other active change orders scheduled in the change management system and determining whether any of the resources involved in the current change order are further involved in any of the other active change orders during the same time period.

For example, in one implementation, the conflict analysis engine may retrieve from the change management database a planned implementation date, an expected duration of time for implementation, and configuration items directly involved in the current change order and the other active change orders. Thus, in response to identifying one or more of the other active change orders that involve one or more of the configuration items involved in the current change order, operation 310 may identify a potential resource collision conflict for the change order if the planned date and/or expected duration of time for implementing the current change order coincides, overlaps, or otherwise collides with the planned date and/or expected duration of time for implementing the other active change orders that were identified. Furthermore, in one implementation, the conflict analysis engine may be configured to prioritize certain types of potential resource collision conflicts. For example, in one implementation, the conflict analysis engine may fetch information from the change database management in an initial query for multiple change orders that have one or more configuration items in common and schedules planning implementation at the same time.

Furthermore, in one implementation, assessing the potential resource conflicts for the change order in operation 310 may further include determining whether the planned changes to any of the resources involved in the change order may impact other resources in the information technology infrastructure. For example, a potential resource collision conflict may be identified in response to determining that the change order defines a planned change to one or more resources and that the planned change to such resources may unintentionally impact one or more other resources, which may be directly and/or indirectly related to the resources involved in the change order. To identify potential resource impact conflicts for the current change order, the conflict analysis engine may assess the relationships analyzed in operation 310 between the resources involved in the current change order and any other resources in the information technology infrastructure. For example, the conflict analysis engine may query the change management database to retrieve the resource relationship information to identify the potential resource impact conflicts. Furthermore, in one implementation, the conflict analysis engine may be configured to prioritize certain types of potential resource impact conflicts. For example, in one implementation, the configuration items in the change management database may be associated with a criticality value to reflect the configuration items that may be critical to a business or important to a particular service, among other things.

In one implementation, in response to assessing the potential resource collision conflicts and resource impact conflicts in operation 310, the conflict analysis engine may then determine whether any such potential resource conflicts were identified in an operation 315. In response to the conflict analysis engine determining that no potential resource conflicts were identified, the conflict analysis engine may then analyze the change order to identify any potential scheduling conflicts in an operation 325, as will be described in greater detail below in connection with FIG. 3b. Otherwise, in response to the conflict analysis engine determining that one or more potential resource conflicts were identified, an operation 320 may include adding such potential resource conflicts to a conflict list for the change order. For example, as described in greater detail above, each potential conflict identified for the change order may be stored in the conflict list to record the analysis that resulted in the potential conflict being identified, which may enable subsequent investigation, notification, and reporting (e.g., through the workflow management system). In response to adding the potential resource conflicts to the conflict list for the change order, the conflict analysis engine may then analyze the change order to identify any potential scheduling conflicts in operation 325.

Figure 3B:
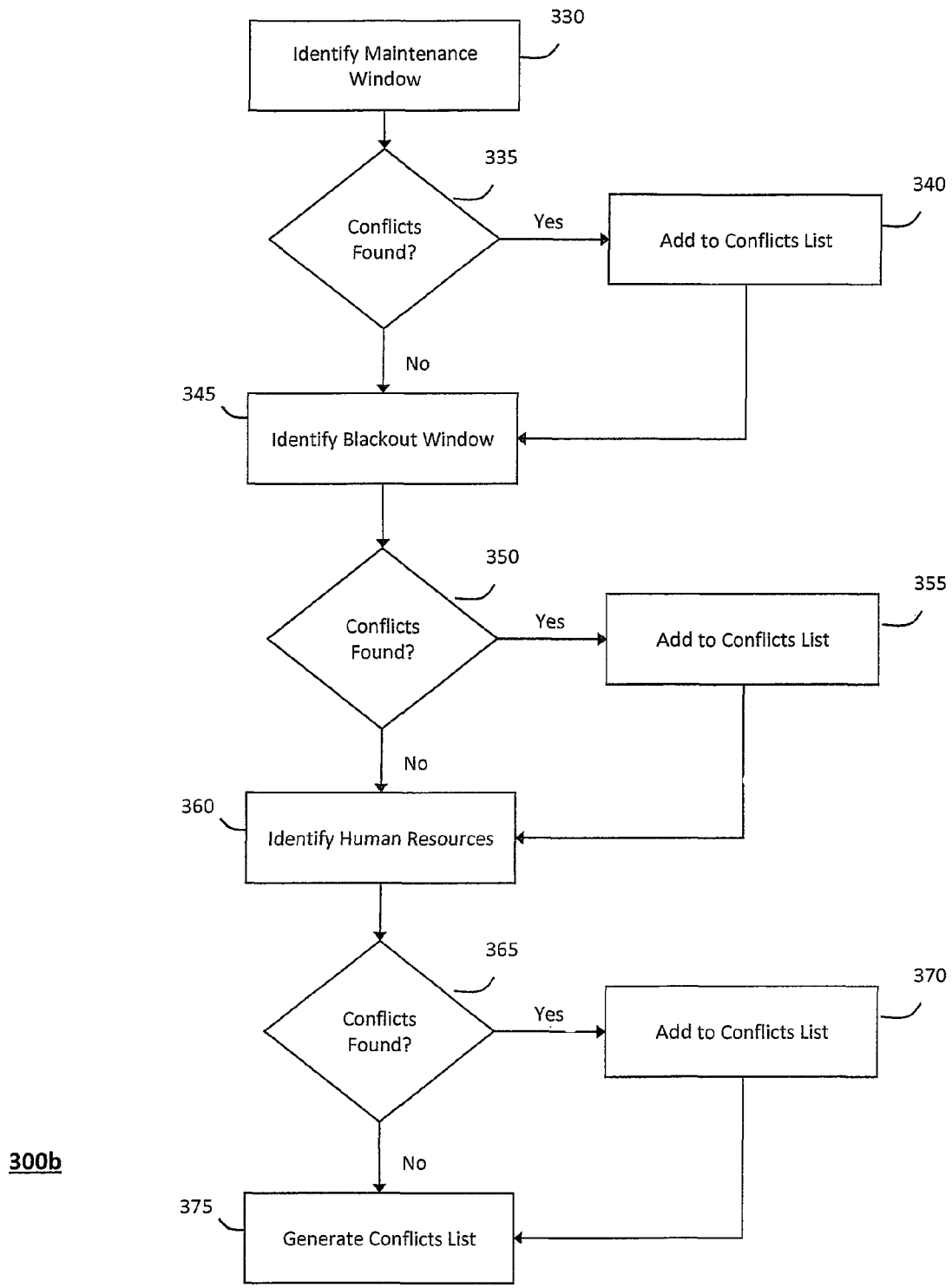
FIG. 3b illustrates a flow diagram of an exemplary method for automatically detecting scheduling conflicts in a change management system, according to one aspect of the invention.

According to one aspect of the invention, FIG. 3b illustrates an exemplary method 300b for automatically detecting scheduling conflicts in a change management system. In particular, in a similar manner as described above in connection with FIG. 3a, the method 300b may generally be performed in the context of operation 240 in FIG. 2 to automatically detect one or more scheduling conflicts in a change order provided to the change management system. As such, the method 300b illustrated in FIG. 3b may include automatically invoking a conflict analysis engine in response to the change management system receiving the change order. In one implementation, the conflict analysis engine may then analyze various schedules for the change order to detect the potential scheduling conflicts. For example, the conflict analysis engine may identify a context for the change order to identify one or more resources in an information technology infrastructure involved in the change order, a schedule for implementing the change order in the information technology infrastructure, one or more contacts defining users involved in the change order, or any other suitable information relevant to the change order context.

In one implementation, detecting the potential scheduling conflicts may include an operation 330, wherein the conflict analysis engine may identify one or more maintenance windows relevant to the change order context. For example, a maintenance window may include a mutually agreed upon time period when certain resources can be safely removed from the information technology infrastructure (e.g., as defined in a service level agreement). Thus, the maintenance windows may generally define various time periods or time segments when changes to certain resources in the information technology infrastructure can be suitably implemented with minimal or no impact on services provided in the information technology infrastructure. Thus, to identify potential maintenance window conflicts for the current change order, the conflict analysis engine may analyze the resources involved in the change order and the schedule for implementing planned changes to such resources to determine whether the change order has been scheduled during a time period that falls within suitable maintenance windows defined for each of the resources involved in the change order.

Thus, in response to identifying the relevant maintenance windows for the resources involved in the change order, the conflict analysis engine may then determine whether any of the planned changes are scheduled during a time period that falls outside the relevant maintenance windows in an operation 335. In response to determining that the planned changes for all the resources involved in the change order are scheduled within their respective maintenance windows, the conflict analysis engine may then analyze the change order for any blackout window conflicts in an operation 345. Alternatively, in response to determining that the planned changes for one or more of the resources are scheduled outside the maintenance window for such resources in operation 335, the conflict analysis engine may add the potential maintenance window conflicts to the conflict list for the change order in an operation 340 prior to analyzing the change order for blackout window conflicts in operation 345.

In one implementation, analyzing the change order for potential blackout window conflicts in operation 345 may include the conflict analysis engine identifying one or more blackout windows relevant to the change order context. For example, a blackout window may include a time period when changes to certain resources in the information technology infrastructure should not occur (e.g., a critical time period that a business designates to prevent disruptions to services that may be critical to the business, such as a monthly billing process). Thus, the blackout windows may generally define various time periods or time segments when changes to certain resources in the information technology infrastructure cannot be implemented without impacting important services provided in the information technology infrastructure. Thus, to identify potential blackout window conflicts for the current change order, the conflict analysis engine may analyze the resources involved in the change order and the schedule for implementing planned changes to such resources to determine whether the change order has been scheduled during a time period that falls within a blackout windows defined for any the resources involved in the change order.

Thus, in response to identifying the relevant blackout windows for the resources involved in the change order, the conflict analysis engine may then determine whether any of the planned changes are scheduled during a time period that falls within the relevant blackout windows in an operation 350. In response to determining that none of the planned changes involved in the change order are scheduled within a blackout window, the conflict analysis engine may then analyze the change order for any human resource scheduling conflicts in an operation 360. Alternatively, in response to determining that the planned changes for one or more of the resources are scheduled within a blackout window, the conflict analysis engine may add the potential blackout window conflicts to the conflict list for the change order in an operation 355 prior to analyzing the change order for human resource scheduling conflicts in operation 360.

In one implementation, analyzing the change order for potential human resource scheduling conflicts in operation 360 may include the conflict analysis engine identifying one or more human resource contacts relevant to the change order context. For example, to implement a particular planned change, certain human resource contacts with particular skills may be required during a time period when the planned changes are scheduled. Thus, the human resource contacts identified in operation 360 may generally include human resource contacts (which may alternatively be referred to as people, users, etc.) that have skills needed to implement the change order. Thus, to identify potential human resource scheduling conflicts for the current change order, the conflict analysis engine may analyze the human resource contacts involved in the change order and the schedule for implementing the change order to determine whether the change order has been scheduled during a time period when the human resource contacts involved in the change order are unavailable. For example, the conflict analysis engine may determine that the contacts involved in the change order are unavailable in response to such contacts having been scheduled to implement multiple change orders at a particular time, having a vacation scheduled, or otherwise unavailable during the time period when the change order has been planned for implementation.

Thus, in response to identifying the relevant human resource contacts for the resources involved in the change order, the conflict analysis engine may then determine whether any of the planned changes are scheduled during a time period when the relevant human resource contacts are unavailable in an operation 365. In response to determining that all of the relevant human resource contacts are available when the changes planned in the change order are scheduled, the conflict analysis engine may then generate the conflicts list for the change order in an operation 375. Alternatively, in response to determining that any of the planned changes are scheduled during a time period when the relevant human resource contacts are unavailable, the conflict analysis engine may add the potential human resource conflicts to the conflict list for the change order in an operation 370 prior to generating the conflicts list for the change order in operation 375.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system for automatically detecting, reporting, and tracking conflicts in a change management system, comprising:
    a change management system configured to receive a change order that includes one or more planned changes to an information technology infrastructure;
    a conflict analysis engine coupled to the change management system, wherein the conflict analysis engine includes one or more processors configured to identify one or more potential conflicts associated with the one or more planned changes to the information technology infrastructure and add the one or more potential conflicts associated with the one or more planned changes to a conflicts list associated with the change order; and
    a workflow management system configured to:
        coordinate one or more workflows to communicate information relating to the one or more potential conflicts among contacts having implementer, affected user, and change manager roles in a context associated with the change order; and
        deploy the change order to implement the one or more planned changes to the information technology infrastructure if the contacts having the implementer, affected user, and change manager roles interact via the one or more coordinated workflows to resolve the one or more potential conflicts in the conflicts list.

2. The system of claim 1, wherein the one or more potential conflicts include a first scheduled change to an information technology resource that collides with a second scheduled change to the information technology resource.

3. The system of claim 2, wherein the one or more processors associated with the conflict analysis engine are further configured to add the one or more potential conflicts that relate to the collision between the first scheduled change and the second scheduled change to a second conflicts list associated with a second change order that plans the second scheduled change to the information technology resource.

4. The system of claim 2, wherein the first scheduled change collides with the second scheduled change if the first scheduled change and the second scheduled change are planned during time periods that overlap or coincide.

5. The system of claim 1, wherein the one or more potential conflicts include a scheduled change to a first information technology resource that impacts a second information technology resource in the information technology infrastructure.

6. The system of claim 1, wherein the one or more potential conflicts include a scheduled change to an information technology resource that falls outside a maintenance window that defines a safe time period to remove the information technology resource from the information technology infrastructure.

7. The system of claim 1, wherein the one or more potential conflicts include a scheduled change to an information technology resource that falls within a blackout window that defines a time period when changes to the information technology resource are prohibited.

8. The system of claim 1, wherein the one or more potential conflicts include a scheduled change to an information technology resource that falls within a time period when a human resource required to implement the scheduled change will be unavailable.

9. The system of claim 1, wherein the one or more potential conflicts in the conflicts list associated with the change order each include:
    a status value that indicates whether the potential conflict has been resolved, and
    a comments field that includes comments relating to the potential conflict.

10. The system of claim 4, wherein the contacts having the implementer, affected user, and change manager roles indicate that the first scheduled change and the second scheduled change to the information technology resource were planned to occur during the time periods that overlap or coincide via the one or more coordinated workflows to resolve the one or more potential conflicts in the conflicts list.

11. The system of claim 5, wherein the contacts having the implementer, affected user, and change manager roles reconfigure the second information technology resource to utilize a third information technology resource in the information technology infrastructure until the scheduled change to the first information technology resource has been implemented via the one or more coordinated workflows to resolve the one or more potential conflicts in the conflicts list.

12. A method for automatically detecting, reporting, and tracking conflicts in a change management system, comprising:
    receiving, at a change management system, a change order that includes one or more planned changes to an information technology infrastructure;
    identifying, at a conflict analysis engine coupled to the change management system, one or more potential conflicts associated with the one or more planned changes to the information technology infrastructure;
    adding the one or more potential conflicts associated with the one or more planned changes to a conflicts list associated with the change order;
    coordinating one or more workflows to communicate information relating to the one or more potential conflicts among contacts having implementer, affected user, and change manager roles in a context associated with the change order; and
    deploying the change order to implement the one or more planned changes to the information technology infrastructure if the contacts having the implementer, affected user, and change manager roles interact via the one or more coordinated workflows to resolve the one or more potential conflicts in the conflicts list.

13. The method of claim 12, wherein the one or more potential conflicts include a first scheduled change to an information technology resource that collides with a second scheduled change to the information technology resource.

14. The method of claim 13, further comprising adding the one or more potential conflicts that relate to the collision between the first scheduled change and the second scheduled change to a second conflicts list associated with a second change order that plans the second scheduled change to the information technology resource.

15. The method of claim 13, wherein the first scheduled change collides with the second scheduled change if the first scheduled change and the second scheduled change are planned during time periods that overlap or coincide.

16. The method of claim 12, wherein the one or more potential conflicts include a scheduled change to a first information technology resource that impacts a second information technology resource in the information technology infrastructure.

17. The method of claim 12, wherein the one or more potential conflicts include a scheduled change to an information technology resource that falls outside a maintenance window that defines a safe time period to remove the information technology resource from the information technology infrastructure.

18. The method of claim 12, wherein the one or more potential conflicts include a scheduled change to an information technology resource that falls within a blackout window that defines a time period when changes to the information technology resource are prohibited.

19. The method of claim 12, wherein the one or more potential conflicts include a scheduled change to an information technology resource that falls within a time period when a human resource required to implement the scheduled change will be unavailable.

20. The method of claim 12, wherein the one or more potential conflicts in the conflicts list associated with the change order each include:
　a status value that indicates whether the potential conflict has been resolved, and
　a comments field that includes comments relating to the potential conflict.

21. The method of claim 15, wherein the contacts having the implementer, affected user, and change manager roles indicate that the first scheduled change and the second scheduled change to the information technology resource were planned to occur during the time periods that overlap or coincide via the one or more coordinated workflows to resolve the one or more potential conflicts in the conflicts list.

22. The method of claim 15, wherein the contacts having the implementer, affected user, and change manager roles reconfigure the second information technology resource to utilize a third information technology resource in the information technology infrastructure until the scheduled change to the first information technology resource has been implemented via the one or more coordinated workflows to resolve the one or more potential conflicts in the conflicts list.

23. A computer readable storage medium contained computer executable instructions for automatically detecting, reporting, and tracking conflicts in a change management system, wherein executing the instructions on a computer causes the computer to:
　receive a change order that includes one or more planned changes to an information technology infrastructure;
　identify one or more potential conflicts associated with the one or more planned changes to the information technology infrastructure;
　add the one or more potential conflicts associated with the one or more planned changes to a conflicts list associated with the change order;
　coordinate one or more workflows to communicate information relating to the one or more potential conflicts among contacts having implementer, affected user, and change manager roles in a context associated with the change order; and
　deploy the change order to implement the one or more planned changes to the information technology infrastructure if the contacts having the implementer, affected user, and change manager roles interact via the one or more coordinated workflows to resolve the one or more potential conflicts in the conflicts list.

24. The computer readable storage medium of claim 23, wherein the one or more potential conflicts include:
　a first scheduled change to a first information technology resource that collides with a second scheduled change to the first information technology resource;
　a scheduled change to a second information technology resource that impacts a third information technology resource in the information technology infrastructure;
　a scheduled change to a fourth information technology resource that falls outside a maintenance window that defines a safe time period to remove the fourth information technology resource from the information technology infrastructure;
　a scheduled change to a fifth information technology resource that falls within a blackout window that defines a time period when changes to the fifth information technology resource are prohibited; and
　a scheduled change to a sixth information technology resource that falls within a time period when a human resource required to implement the scheduled change will be unavailable.

25. The computer readable storage medium of claim 24, wherein the contacts having the implementer, affected user, and change manager roles indicate that the first scheduled change and the second scheduled change to the first information technology resource were planned to occur during time periods that overlap or coincide via the one or more coordinated workflows to resolve the one or more potential conflicts in the conflicts list.

26. The computer readable storage medium of claim 24, wherein the contacts having the implementer, affected user, and change manager roles reconfigure the third information technology resource to utilize a seventh information technology resource until the scheduled change to the second information technology resource has been implemented via the one or more coordinated workflows to resolve the one or more potential conflicts in the conflicts list.

* * * * *